United States Patent Office 3,108,441
Patented Oct. 29, 1963

3,108,441
PROCESS FOR SEALING SOILS
Carl E. Watson, Richmond, Calif., assignor to California Research Corporation, San Francisco, Calif., a corporation of Delaware
No Drawing. Filed Jan. 11, 1962, Ser. No. 165,669
12 Claims. (Cl. 61—36)

This invention relates to a process whereby porous soils are rendered impervious to water. More particularly, this invention is directed to a process whereby a sub-surface membrane is formed to impede the flow of water through porous soils.

This invention is a continuation-in-part of patent application Serial No. 106,199, filed April 28, 1961 and now abandoned.

This invention has practical applications for irrigation for farm lands, and wherever it is desirable to stop the percolation of water through sand for the construction of bridge piers, drilling oil wells, etc., or in any instance where it is necessary to inhibit the flow of water through soils.

The main purpose for the process described herein is to prevent the loss of water in irrigation canals through seepage. Water is transported freely in earth canals to irrigate crops, to supply water for cattle, etc. It is well known that approximately fifty percent of the water which is in canals is lost simply through percolation through the soil bordering the canals. Thus, millions of gallons of water are lost daily through the seepage of the water into the soil over which it is being carried.

Numerous functional requirements must be met by canal sealants useful to transport water for irrigation purposes. In order to reduce the loss of water, particularly in the West where water is so difficult to obtain, it is desirable to reduce seepage. Furthermore, the material which is used in the water to inhibit this seepage must be nontoxic to humans, animals and crops. Also, the means which is used to inhibit such seepage must be at a sufficient depth in the soil to resist damage by animals and equipment which may move along the canals. Furthermore, weather conditions such as freezing or thawing, must not affect the sealant; and finally, the sealant, if broken, must be capable of rehealing itself.

It is a primary object of this invention to describe a process by which a seal is formed to inhibit the flow of water through porous soils, which seal is of such a nature as to be non-toxic to humans, animals and crops, be of such a depth in the porous soil as to resist damage by animals or equipment moving thereon, and to withstand the ravages of weather.

In accordance with this invention, it has been discovered that water seepage through porous soils can be inhibited by the formation of a subsurface seal, which seal is formed by a process whereby aqueous wax dispersions are caused to flow onto and to penetrate porous soils.

Thus, in the process of this invention, the water permeability of soils is reduced by applying an aqueous wax dispersion to porous soils. The dispersion penetrates the soils, and the dispersion breaks to form a wax seal below the soil surface.

The process described herein is effective not only for the formation of subsurface seals in canals used for transportation of water, but the process described herein can also be used to form mammoth planting tubs whereby grasses and trees, for example, can be planted in extremely arid lands.

Although diffuse seals can be formed in soils to reduce somewhat the water seepage rate through porous soils, this invention is directed primarily to the formation of sub-surface membranes which markedly reduce the water seepage rate.

As used herein, the term "wax membrane" means a non-diffuse waxy layer which is formed in the soil. This waxy layer consists of wax and soil particles adhering to each other to form a closely knit, self-supporting structure essentially parallel with a soil surface. This structure is at least $1/32$ inch in thickness and at least two inches below the surface of the soil. Although the membranes can possibly be $1/16$ inch, $1/4$ inch, etc., in thickness, depending on the amount of wax in the emulsion, it is desirable that the membrane be of a thickness sufficient to inhibit water seepage through the soil. A membrane having even a minimum thickness will not be damaged by movement on the soil surface if the membrane is of sufficient depth beneath the surface.

Waxes which can be used herein in the formation of aqueous wax dispersions include petroleum waxes having average melting points in the range of 100° F. to 190° F. AMP. (the term "AMP" refers to American Melting Point, as defined in ASTM D–87–42). This encompasses materials containing waxes, such as waxy distillates, etc. Particularly effective waxes are the paraffin waxes having melting points in the range of 125° F. to 165° F. AMP.

In the formation of wax dispersions which effectively penetrate porous soils to form wax membranes, it is desirable that the wax particles which are dispersed in the aqueous medium have a particle size no greater than 5 microns. In order that the wax membrane may be formed at a greater depth beneath the soil surface, it is preferred that the wax particle size in the wax emulsion is from 0.1 to 2.5 microns.

In the preparation of such aqueous dispersions of finely divided paraffin wax particles, it is necessary to use a dispersing agent. The particular dispersing agent to be used depends on the porosity of the soil which is being treated, that is, the rate at which the water seeps through the soil.

Dispersing agents are classified as nonionic, cationic, anionic, amphoteric, or mixtures thereof. Each of these classes of dispersing agents is of particular value herein when used with soils of certain porosities, that is, soils classified as to water seepage rate. Thus, the particular type of dispersing agent which is to be used is governed by the water seepage rate of the soil. The water seepage rate for the soil is defined as the amount of water which seeps through a standardized depth of soil in terms of cubic feet of water per day per square foot of soil surface area. This seepage rate is determined by a standardized test procedure, whereby four feet of the soil to be tested is placed at field density in a vertically positioned 5 foot high glass tube having an inside diameter of 2 inches. Water is poured onto the soil to maintain a two foot head of water in the soil. The amount of water seeping through the soil for a standard period of time is then measured to obtain the water seepage rate.

Using the water seepage rate as the basis, the particular dispersing agent is then determined from the following table:

TABLE I

| Seepage Rate— Cubic Feet of Water per square foot of soil area per day | Type of Dispersing Agent | Particle Size of Wax in Dispersion (Microns) |
|---|---|---|
| (1) 0.1–0.3 | No Soil Sealant Required | |
| (2) 0.3–2.0 | Nonionic | 0.5 |
| (3) 2.0–30 | Anionic | 0.25–5 |
| (4) 30–600 | (a) Amphoteric; (b) Soil Pretreatment with Cationic Dispsersant followed by wax dispersion; (c) Cationic dispersants added to aqueous wax dispersions stabilized by anionic or nonionic dispersants. | 1–10 |

When the soils have seepage rates in excess of 30 cu. ft. per sq. ft. per day, it is beneficial to pour on to the soil a water solution of a cationic dispersing agent prior to treating the soil with an aqueous dispersion of wax particles stabilized by an anionic dispersing agent, a cationic dispersant may be added to the aqueous dispersion of wax particles. However, this particular use of cationic dispersant may be eliminated by the use of an amphoteric dispersing agent.

Thus, the subsurface membranes described herein are beneficial in soils having seepage rates of 0.3 cubic feet or more per square foot per day.

In general, subsurface wax membranes are formed in soils having average particle sizes in the range of 20–200 mesh.

Examples of dispersing agents which can be used herein in the formation of stable aqueous dispersions of wax particles useful in the formation of subsurface membranes for porous soils are as follows:

Cation active compounds which can be used include the salts of quaternary ammonium bases, and primary, secondary and tertiary amines, all of which may be aliphatic, alicyclic, aromatic or mixed, and which may contain substituents such as chlorine, hydroxyl, ether, esters, etc.

Cationic dispersing agents can be exemplified by the chloride, nitrate, sulfate, etc. salts of paraffin wax amines, monoalkylamines, such as laurylamine, myristylamine, cetylamine, etc.; secondary amines such as methylcetyl amine, ethylstearyl amine, laurylstearyl amines, etc.; quaternary bases such as trimethylcetyl ammonium hydroxide, dimethylphenylstearyl ammonium hydroxide, etc.

Nonionic dispersing agents include fatty acid-alkanolamine condensates; ethylene oxide-fatty acid condensates; alkyl, aryl polyether alcohols; ethylene oxide-fatty alcohol condensates, polyoxyethylene thioethers, polypropylene glycol-ethylene oxide condensates, etc. The polyoxyethylene derivative of sorbitan monopalmitate is a particularly effective nonionic dispersant.

Anionic dispersing agents include the salts of sulfated alcohols, for example, the alkali metal salts of sulfated lauryl alcohol, sulfated cetyl alcohol, stearyl alcohol, etc.; the akali metal salts of sulfated oils, such as sulfated castor oil, etc.; the numerous sulfonates, for example, metal salts of petroleum sulfonic acids, metal salts of sulfonated amides, metal salts of sulfonated ethers, metal salts of alkyl, aryl sulfonic acids, etc.; alkali metal salts of fatty acids, for example, sodium oleate; metal salts of high molecular weight phosphonic acids, partial esters of phosphonic acids, naphthenic acids, etc. In place of the metal in the above dispersants, low molecular weight ammonia derivatives are included, for example, ammonium salts, amine salts, etc., as exemplified by triethanolamine oleate, triethanolamine stearate, etc.

Amphoteric dispersing agents are exemplified as follows: $C_8$—$C_{24}$-alkylamine carboxylic acids and their water-soluble salts, such as N-dodecyl-$\beta$-imino-propionic acid; N-substituted amino acid derivatives obtained by condensation of fatty primary amines and acrylic monomers, including those sold to the trade under the generic name of "Deriphats" by the Chemical Division of General Mills, Inc., for example, N-fatty-$\beta$-aminopropionates, such as Deriphat 151 and Deriphat 170C.

The dispersing agents are used in amounts of 0.001% to 0.1%, by weight, in the aqueous wax dispersion which is used to penetrate the porous soil.

The waxes are used in amounts of 0.05% to 2%, by weight, as finely divided dispersed particles in the aqueous dispersion.

In order that the wax emulsion described herein may provide the requisite amount of wax per unit of soil bottom area in a flowing stream of water, it is essential that the wax emulsion itself remain over that area for a sufficient length of time to permit penetration of the soil by the wax emulsion to form a subsurface membrane. Although it is preferred that the time at which the wax emulsion passes a given point is in excess of 2 hours, for example 2 to 12 to 24 hours, a time period of 30 minutes can be sufficient in some instances. In slow flowing streams wherein the rate of water flow is from about 1 to about 3 feet per second, the wax emulsion concentrate can be injected into the water of the stream for a period of time sufficient to form a stream of diluted wax emulsion. The time during which the diluted wax emulsion passes a point in the stream must be sufficient to give a residence time for the wax emulsion to penetrate the soil of that area to form the subsurface wax membrane.

Although the wax emulsion concentrate itself may be used, it is preferred to dilute the concentrate so that the final diluted wax emulsion has a wax content from about 0.05% to about 2%, by weight.

Where the stream bed has a steep slope such that the water flow rate of the water stream is in excess of 3 to 3.5 feet per second, it is desirable to install small dams across the stream to impede the water flow. For example, earth dams 6 inches high can be placed across a dry stream at various distances apart down the stream bed. The wax emulsion concentrate and the diluent water can be poured onto the dry stream bed simultaneously. The diluted emulsion moves down the bed until the first dam is reached. The level of the diluted emulsion then increases to the six inches, then the diluted stream overflows the first dam and repeats the process going to and going over the second dam, etc.

The examples hereinbelow illustrate the process of this invention.

*Example I*

A canal 1200 feet long and 16 feet wide having a water flow rate between 1 to 2 feet per second was treated. The wax emulsion concentrate used had the composition:

| | Percent by weight |
|---|---|
| Wax, 125–130° F. AMP. | 28.0 |
| Oleic oil | 1.0 |
| Triethanolamine | 0.135 |
| Polyoxyethylene sorbitan monopalmitate (Tween 40) | 1.0 |
| Carbopol 934 (described hereinbelow) | 0.1 |
| Water | 69.765 |
| | 100.000 |

This concentrate was diluted at 1 part per 125 parts of water, and the resulting diluted emulsion was poured into the canal at a rate to provide a 5½ inches initial depth, which gradually reached a steady depth of 3½ inches after 50 feet downstream.

Example 1A hereinbelow is further illustrative of the use of a flowing method for forming subsurface wax membranes.

*Example 1A*

Water was flowing into an irrigation ditch at the rate of about 97 gallons per second (g.p.s.). This rate was reduced to about 15 g.p.s. The emulsion concentrate of Example I hereinabove was injected into the ditch water. Thus, the dilution was about 1 to 10. After a period of 12 hours, the diluted emulsion stream was about 1400 feet long. After two days, the emulsion stream was about 4800 feet long. A marked reduction in water seepage was observed.

As noted herein, a ponding method can be used to treat canals, etc. By this method, one or more dams are constructed across the stream or canal at the same or varying distances downstream from one another. Although the dams may be equidistant from each other, it is preferred to place each succeeding dam nearer to the immediately prior dam so that each succeeding pond becomes smaller. By this method, a diluted wax emulsion can have a longer residence time over a particular area of soil before the continued addition of water to the diluted emulsion forced the emulsion over the dam, into the next "pond."

By this ponding process, ponds are formed along the watercourse, that is, the stream. For example, a first pond is formed in an upstream section of the watercourse, a concentrated aqueous dispersion of wax is injected (such as by pouring) into the first pond to form a diluted or supernatant aqueous dispersion of the wax. This dispersion has a residence time in the first pond sufficient to permit the dispersion to penetrate the bottom soil to form a subsurface membrane. The residual dispersion of wax then moves over the dam to the contiguous downstream pond, and this process continues until the wax dispersion has been utilized.

*Example II*

Mixture A was prepared by blending 2.5 grams of Carbopol 934 (a vinyl polymer having active carboxyl groups—a product of B. F. Goodrich Chemical Co.) and 2120 grams of water with violent agitation for a period of 30 minutes at ambient temperature, after which there was added 12.5 grams of a polyoxyethylene derivative of sorbitan monopalmitate sold as Tween 40 by the Atlas Chemical Co., and 3.4 grams of triethanolamine, and the resulting mixture was heated to a temperature of 200° F.

Mixture B was prepared by blending 12.5 grams of oleic acid and 350 grams of petroleum paraffin wax having a melting point range of 125–130° F. AMP., and heating to a temperature of 200° F.

Mixture B was slowly added to Mixture A at 200° F. with violent agitation, resulting in an aqueous wax dispersion concentrate useful according to the process described herein in the formation of a subsurface wax membrane in porous soils.

The effectiveness of this wax dispersion in reducing water seepage in porous soils was determined by diluting this aqueous wax dispersion with water to a solids content of 0.5%, by weight. The diluted wax dispersion was poured on to a soil having a seepage rate of 7.8 cu. ft. per sq. ft. per day. After four hours, the seepage rate was approximately 1.5 cu. ft. per sq. ft. per day. After 48 hours, the seepage rate was 0.1 cu. ft. per sq. ft. per day. This test was made in the 5 foot high glass tube described hereinabove, using a two foot head of water.

*Example III*

Mixture A was prepared by blending 12.5 grams of Tween 40, 3.4 grams of triethanolamine, 2.5 grams of Carbopol 934, and 2120 grams of water at 200° F. with agitation.

Mixture B was prepared by blending 175 grams of paraffin wax having a melting point range of 125–130° F. AMP., 175 grams of a waxy residuum from slack wax having a melting point range of 155–177° F. and 12.5 grams of oleic acid by heating to 200° F. with agitation.

Mixture B was slowly poured into mixture A with violent agitation at 200° F. The resulting dispersion served as a concentrate for the formation of a wax membrane according to the process of this invention.

*Example IV*

Mixture A was prepared by blending 2120 grams of water, 3.4 grams of triethanolamine, 12.5 grams of Tween 40, and 2.5 grams of Carbopol 934 at 200° F.

Mixture B was prepared by blending 350 grams of a waxy distillate from a Minas crude, and 12.5 of oleic acid with agitation at 200° F.

Mixture B was slowly poured into mixture A with violent agitation at 200° F. to form the desired wax dispersion.

*Example V*

Mixture A was prepared by blending 1950 grams of water and 50 grams of N-lauryl-β-aminopropionic acid at 200° F. with agitation.

Mixture B was prepared by heating 975 grams of water and 500 grams of petroleum wax having a melting point range of 125–130° F. AMP. to 200° F. with agitation.

Mixture B was slowly poured into mixture A with violent agitation at 200° F. resulting in the formation of an aqueous wax dispersion.

*Example VI*

An aqueous wax dispersion having a solids content of 0.2%, by weight, was prepared from a petroleum wax having a melting point of 125° F. to 130° F. AMP., using Arquad T–50 as a cationic dispersing agent. Arquad T–50, a product of the Chemical Division, Armour Company, is an organo trimethyl quaternary ammonium chloride wherein the organo radical consists of a mixture of the following hydrocarbon radicals: tetradecyl—3%, hexadecyl—27%, octadecyl—16%, octadecenyl—48%, and octadecadienyl—6%. This aqueous wax dispersion was poured onto a soil having a seepage rate of about 18 cu. ft. per sq. ft. per day. After 6 hours, the seepage rate had been reduced to about 1.5 cu. ft. per sq. ft. per day.

The dispersions prepared as concentrates according to the examples set forth hereinabove were diluted with water to form an aqueous wax dispersion having the desired wax content. This dilution of the concentrate may be accomplished by simply adding water to the concentrate, then pouring the resulting diluted dispersion onto the porous soil. On the other hand, the concentrate itself may be poured into a water-carrying canal, for example, that is, a canal already containing flowing water, so that the desired concentration of the wax is obtained by dilution with the water in the canal itself.

The wax content of aqueous dispersion useful as soil sealants can range from 0.05% to 5%, by weight, preferably from 0.2% to 2%, by weight.

Table II hereinbelow presents data of wax membranes formed in 4 feet of soil in a 5 foot high glass tube having an inside diameter of 2 inches. The depths in the soil at which the membranes formed varied with the concentration of the wax dispersion in the aqueous phase. The wax dispersion used was that prepared according to the examples hereinabove.

The concentrate of the wax dispersion had the following composition:

| Composition: | Weight percent |
|---|---|
| Wax, 125–130° F. AMP. | 14.0 |
| Oleic acid | 2.0 |
| Tween 40 | 2.0 |
| Water | 82.0 |

The dispersing agent used herein (i.e. Tween 40—described in detail hereinabove) was a nonionic dispersing agent.

The soil had an average particle size of 140 mesh, and a seepage rate of 2 cu. ft. per sq. ft. per day.

TABLE II

| Emulsion Concentration: | Depth of Membrane, inch |
|---|---|
| 0.088 | 0.75 |
| 0.070 | 4.0 |
| 0.061 | 8.5 |
| 0.053 | 19.5 |

After the treatment of the soil with the aqueous wax dispersion, the water seepage was practically zero.

Table III hereinbelow presents data on the effectiveness of anionic dispersing agents in forming wax membranes at various depths in various concentrations in the glass tube test.

The emulsion concentrate had the following composition:

| Composition: | Weight percent |
|---|---|
| Wax, 125–130° F. AMP. | 14.0 |
| Oleic acid | 0.5 |
| Tween 40 | 0.5 |

Triethanolamine _____ 0.135
Carbopol 934 _____ 0.1
Water _____ 84.8

The emulsion obtained was diluted according to the data in Table II hereinbelow.

The soil had a seepage rate of 30 cu. ft. per sq. ft. per day, and an average particle size of 100 mesh. After the treatment with the aqueous wax dispersion, the seepage rate was practically zero.

TABLE III

Dispersion Concentration:      Depth of seal, inch
1.0 _____ 4
0.5 _____ 12.5
0.3 _____ 29

Thus, the solids concentration of the wax dispersion may be increased to reduce effectively the seepage rates of more porous soils. The solids content can be varied from 0.1% to 1%.

A wax dispersion prepared as in Example II hereinabove was used in the formation of a subsurface wax membrane in a porous soil in an irrigation canal. The rate of flow of water through the canal was 3,000 gallons per hour. A section of the canal was dammed off to form a large basin having dimensions approximately 2 ft. in depth, 8 ft. in width, and 50 ft. in length. The emulsion concentrate of Example I hereinabove was slowly poured into the irrigation canal at the water inlet of the canal in an amount to form a dispersion in the canal water having a solids content of 0.5% by weight. After sufficient emplsion had been poured into the canal to provide approximately 3 pounds of wax per sq. yard of porous soil layer, the flow of water was stopped to permit the formation of the wax membrane, and the wax membrane was measured. The seepage of water through the porous soil was almost eliminated.

Within the canal bed itself, the wax formed a membrane approximately one foot beneath the surface of the canal, forming a firm impervious bond preventing the water from passing therethrough. The wax membrane was approximately $\frac{1}{32}$ inch thick.

Once the wax emulsion has begun to penetrate the soil in the above-noted technique of forming the exemplified 2' x 8' x 50' basin, water may again be run into this basin, filling the basin, and overflowing over the dividing dam to form a new basin which will then utilize additional amounts of the remaining wax emulsion not utilized in the first basin. A series of basins may be used to form subsurface wax membranes in canals.

Rather than transport large amounts of water as a part of the aqueous wax dispersion used according to the process described herein, concentrates of the components may be formed in the following percentage ranges.

Composition:      Percent by weight
Wax component _____ 14-35
Dispersing agent _____ 0.4-4.5
Water _____ 60.5-85.6

In the preparation of the concentrates of aqueous wax emulsion, the emulsion is normally formed by heating the components with agitation to temperatures in excess of the melting point of the wax. Once the aqeuous wax emulsion has been prepared at such temperatures, it is preferred to maintain the emulsion at temperatures in excess of 100° F., still more preferably at temperatures in excess of the melting point of the wax, but normally in excess of 125° F., until the concentrate is diluted at the site where the water-resistant membrane is to be formed. Although in some cases, the aqueous wax emulsion concentrate may be kept at temperatures as low as room temperature prior to dilution for use, higher temperatures are preferred in order that the process described herein may result in obtaining membranes at a greater subsurface depth in the soil being treated. The marked increased effectiveness of aqueous wax dispersions in forming deeper subsurface membranes for reducing water seepage when prepared at higher temperatures is shown in Table V hereinbelow. The process for preparing such dispersions was similar to that described hereinabove by heating the components to a temperature of 200° F. The resulting concentrates were cooled to the temperature noted in Table V and maintained at that temperature until use. The concentrate composition was as follows:

TABLE IV

Composition:      Weight percent
(1) Wax (identified hereinbelow) _____ 28.000
(2) Tween 40 (identified hereinabove) ___ 1.000
(3) Oleic acid _____ 1.000
(4) Triethanolamine _____ 0.135
(5) Carbopol 934 (identified hereinabove) 0.100
(6) Water _____ 69.765
                                          100.000

In evaluating the effectiveness of storage temperatures on membrane formation, 20 cc. of the aqueous wax emulsion concentrate was diluted with 40 cc. of water to obtain a solids content of 10%.

In Table V hereinbelow, wax A was a petroleum paraffin wax having a melting point range of 125° to 130° F. AMP., and wax B was a petroleum paraffin wax having a melting point range of 154° to 156° F. AMP.

The seepage rate was determined in the same manner described hereinabove by use of a 5 foot high glass tube.

TABLE V

| | | Seepage Rate of Soil, cc./minute | | Depth of Seal(s) Formed, inches |
|---|---|---|---|---|
| Wax | Temp. of Concentrate Prior to Dilution, ° F. | Prior to Treatment | After Treatment | |
| (1) A | 70 | 4.6 | 0.05 | [1] 1.1 |
| (2) A | 140 | 4.6 | 0.05 | 4.8 |
| (3) B | 70 | 4.2 | 0.05 | [1] 2.9 |
| (4) B | 140 | 4.2 | Nil | 5.0 |

[1] A thin surface seal also formed.

In treating soils to reduce the seepage rate thereof, it is beneficial to be able to use only one basic soil sealant. Keeping in supply only one soil sealant eases the storage and inventory problems as opposed to requiring one specific soil sealant for each type of soil.

Aqueous wax emulsions stabilized by weakly anionic dispersants are quite universal in treating soils having seepage rates up to about 40 cubic feet per square foot per day. However, these same soil sealants can also be used for more porous soils by the mere addition thereto of cationic dispersants in amounts more than sufficient to neutralize the effect of the anionic dispersant.

As set forth by the data in Tables VI, VII and VIII hereinbelow, the addition of cationic dispersants to anionic-dispersant-stabilized wax emulsions effectively reduces the water seepage rate of highly porous soils. The composition of the anionic dispersant stabilized wax emulsion was the same as that of Table IV hereinabove.

Wax A of Tables VI, VII and VIII was a petroleum paraffin wax having a melting point range of 125° F.– 130° F. AMP. Wax B was a petroleum paraffin wax having a melting point range of 154–156° F. AMP. Wax C was a waxy distillate from a Minas crude.

The cationic dispersant was the Arquad T–50 described hereinabove.

The effectiveness of these new compositions as sealants was determined by the seepage rates as described hereinabove.

TABLE VI

| Wax | Cationic Dispersant Concentration, Wt. Percent | Seepage Rate, cu.ft./sq.ft./day | | Reduction in Seepage Rate (percent) |
|---|---|---|---|---|
| | | Before Treatment | After Treatment | |
| A | 0.000 | 24.0 | 0.1 | 99.8 |
| A | 0.025 | 20.8 | 0.1 | 99.9 |
| A | 0.050 | 21.0 | 0.3 | 98.5 |
| A | 0.100 | 21.5 | 0.4 | 98.0 |
| B | 0.000 | 28.5 | 1.8 | 93.6 |
| B | 0.025 | 32.5 | 0.3 | 99.0 |
| B | 0.050 | 29.5 | 0.8 | 97.2 |
| B | 0.100 | 37.0 | 1.2 | 96.8 |
| C | 0.000 | 19.5 | 17.5 | 10.3 |
| C | 0.025 | 23.9 | 11.0 | 54.0 |
| C | 0.050 | 20.0 | 2.0 | 90.0 |
| C | 0.100 | 34.0 | 1.0 | 97.0 |

TABLE VII

| Wax | Cationic Dispersant Concentration, Wt. Percent | Seepage Rate, cu.ft./sq.ft./day | | Reduction in Seepage Rate (percent) |
|---|---|---|---|---|
| | | Before Treatment | After Treatment | |
| A | 0.000 | | | |
| A | 0.025 | 92.8 | 2.5 | 97.3 |
| A | 0.050 | 74.7 | 0.1 | 99.5 |
| A | 0.100 | 70.0 | 0.1 | 99.6 |
| B | 0.000 | 77.2 | 0.5 | 99.3 |
| B | 0.025 | 79.5 | 1.6 | 97.9 |
| B | 0.050 | 89.6 | 0.4 | 99.5 |
| B | 0.100 | 75.0 | 0.1 | 99.6 |
| C | 0.000 | 86.0 | 46.0 | 46.5 |
| C | 0.025 | 80.0 | 13.1 | 83.7 |
| C | 0.050 | 67.5 | 9.7 | 85.6 |
| C | 0.100 | 66.5 | 18.6 | 72.0 |

TABLE VIII

| Wax | Concentration, Wt. Percent | Seepage Rate, cu.ft./sq.ft./day | | Reduction in Seepage Rate (percent) |
|---|---|---|---|---|
| | | Before Treatment | After Treatment | |
| A | 0.000 | 141.5 | 112.5 | 20.6 |
| A | 0.025 | 140.0 | 0.1 | 99.9 |
| A | 0.050 | 130.0 | 67.0 | 48.5 |
| A | 0.100 | 150.0 | 45.0 | 70.0 |
| A | 0.200 | 166.7 | 11.0 | 93.4 |
| B | 0.000 | 160.8 | 152.4 | 8.1 |
| B | 0.025 | 147.5 | 0.1 | 99.9 |
| B | 0.050 | 146.7 | 28.1 | 80.5 |
| B | 0.100 | 166.0 | 27.5 | 83.3 |
| B | 0.200 | 161.3 | 15.0 | 90.9 |
| C | 0.000 | 167.1 | 147.5 | 12.0 |
| C | 0.025 | 152.5 | 0.1 | 99.9 |
| C | 0.050 | 155.0 | 0.1 | 99.9 |
| C | 0.100 | 152.5 | 14.5 | 90.5 |
| C | 0.200 | 160.0 | 54.0 | 66.3 |

In certain instances it may be desirable to add an anionic dispersant to a cationic dispersant stabilized wax emulsion to form the desired subsurface wax membrane.

In highly porous soils, it is beneficial to treat the soil with certain amines prior to the addition of the aqueous wax dispersion. Such amines can be exemplified by ethylene diamine hydrochloride, diethylene triamine hydrochloride, triethylene tetramine hydrochloride, trimethylammonium chloride, etc.

The above clearly shows that blending a small amount of an aqueous wax dispersion into water, for example, the water of irrigation canals, clearly reduces the seepage of water through the porous soil.

In the formation of wax membranes in subsurface porous soils, the amount of aqueous wax emulsion used is that amount sufficient to form a membrane, that is, an amount which will supply at least 0.5 pound of wax per sq. yard of soil surface area, preferably from 2.0 to 3.0 pounds of wax per sq. yard of soil surface area. These amounts provide a stable wax membrane which inhibits the loss of water by seepage through the porous soil.

For a more effective formation of the wax membrane by the process described herein, it is beneficial to remove or break-up the top layer of silt or other extremely fine material which may have formed on the soil surface prior to treatment with aqueous wax emulsion. Furthermore, although the process can be used with dry soil surfaces, it is preferred that the soil surfaces be wetted surfaces.

When it is determined that the seepage rates in porous soils are greater than 100 cubic ft. per sq. ft. per day, additional means may also be used to improve the retention of water, that is, to reduce the seepage rate. In addition to the processes noted hereinabove for reducing the seepage rate of porous soils having such great seepage rates, an asphalt-in-water emulsion can be used as a primary treatment for the soil prior to the addition thereto of a wax dispersion described herein. By penetrating the soil with an asphalt emulsion, an asphalt membrane is not formed, but the voids between the soil particles themselves became smaller. The asphalt is vertically diffused through the soil. The addition of an aqueous wax dispersion to an asphalt treated soil forms a wax membrane in the porous soil to inhibit the flow of water.

A markedly effective reduction in water loss in a watercourse was obtained by forming a subsurface wax membrane by the process described herein in an irrigation canal 6.6 miles in length and varying in width from 20 feet at the beginning to 10 feet at the end. The water was added to the canal at the rate of 27.6 cubic feet per second. Prior to treatment, only 7.92 cubic feet per second of water reached the terminus of the canal. That is, at the end of the 6.6 miles of flow in the canal, the rate of water flow was only 7.92 cubic feet per second, a loss of 19.68 cubic feet per second.

The concentrated wax emulsion described hereinabove in Table IV was added to the water at a rate of 400 gallons per minute until 44,000 gallons of the wax emulsion concentrate had been added. The diluted wax emulsion had a solids content of 0.9% by weight. When the 44,000 gallons had been added to the canal, the diluted emulsion section was approximately 0.5 mile in length, gradually lengthening to 2 miles, due to the narrowing of the canal.

After approximately 24 hours, the delivery of water at the terminus of the canal had increased to 18.94 cubic feet per second. After approximately 48 hours, the delivery of water at the terminus had increased to 20.93 cubic feet per second. Thus, the water loss had been reduced by at least 47%.

Effective reduction of seepage rates of porous soils is obtained by pouring onto porous soils a blend of aqueous wax emulsions and aqueous asphalt emulsions.

I claim:

1. A process for reducing seepage loss of water through a porous soil from a body of water contiguous to and in contact with the surface of said soil, said soil having a seepage rate of from 0.3 to 600 cubic feet of water per square foot of soil per day, which comprises adding a concentrated aqueous dispersion of wax-in-water to said body of water to form a dilute dispersion of 0.05% to 5.0% by weight of wax in water, the linear flow rate of said body of water being not more than about 3.5 ft./second, the particle size of the wax being no greater than 5 microns, maintaining the resultant body of diluted dispersion in contact with said surface for a time of at least thirty minutes sufficient to permit seepage penetration of said dispersion from said surface into said porous soil and to deposit a sub-surface wax membrane composed of wax and soil particles adhering to each other forming a closely knit, self-supporting waxy layer essentially parallel with the soil surface and at least two inches beneath said surface, said membrane being at least 1/32 inch thick sufficient to inhibit seepage of water therethrough.

2. The process of claim 1 in which said porous soil forms the bed of a watercourse, forming in an upstream section of said watercourse a first pond containing said dilute dispersion of wax, forming a second pond downstream from the first pond and moving residual supernatant dispersion from the first pond into the second pond, the dispersion being maintained in each pond for a time sufficient to form said membrane.

3. In the process of claim 1 wherein said porous soil forms the bed of a watercourse, the steps of forming a series of successive ponds in said watercourse, forming said dilute dispersion of wax in an upstream pond, moving residual supernatant dilute dispersion from an upstream pond to a contiguous downstream pond, and maintaining said dispersion in each pond for a sufficient time to form said membrane before moving the residual dispersion to the contiguous downstream pond.

4. The process of claim 1, wherein said body of diluted dispersion of wax-in-water contains from 0.05% to 2% by weight of wax.

5. The process of claim 1, wherein said concentrated aqueous dispersion of wax is maintained at a temperature above about 125° F. prior to the addition thereof to said body of water.

6. The process of claim 1 wherein the body of water is a flowing stream.

7. The process of claim 1 wherein the body of water is a pond.

8. The process of claim 1 wherein said concentrated aqueous dispersion of wax contains from 14% to 35% by weight of wax, from 0.4% to 4.5% by weight of a dispersing agent, and from 60.5% to 85.6% by weight of water.

9. The process of claim 1 wherein said wax is a petroleum wax having a melting point of about 100° F. to 190° F. amp.

10. The process of claim 1 wherein the concentrated dispersion contains an anionic dispersing agent.

11. The process of claim 1 wherein the concentrated dispersion contains a cationic dispersing agent.

12. The process of claim 1 wherein the concentrated dispersion contains a non-ionic dispersing agent.

References Cited in the file of this patent

UNITED STATES PATENTS

| | | |
|---|---|---|
| 2,175,804 | Hulst | Oct. 10, 1939 |
| 2,190,003 | Hulst | Feb. 13, 1940 |
| 2,456,595 | Rood | Dec. 14, 1948 |
| 2,666,620 | Welge | Jan. 19, 1954 |
| 2,706,688 | Sommer | Apr. 19, 1955 |

OTHER REFERENCES

A Review of the Use of Chemical Sealants For Reduction of Canal Seepage Losses Lower-Cost Canal Lining Program Analytical Lab. Report No. CH 102 by Div. of Engineering Lab., U.S. Dept. of the Interior, Bureau of Reclamation. Feb. 9, 1960, pages 2, 6, 9, 10 and Bibliographies 10 (2 sections) 19, 26, 27 and 28 (2 sections).